No. 688,009. Patented Dec. 3, 1901.
P. SIEGEL & M. H. ABRAHAMS.
AUTOMATIC MEANS FOR CONSERVING ENERGY OF ELECTRIC BATTERIES.
(Application filed Apr. 25, 1901.)

(No Model.) 2 Sheets—Sheet 1.

WITNESSES:
M. M. Durkin
L. Duane

INVENTORS
Philip Siegel,
Moïs H. Abrahams,
BY
J. R. Littell
their ATTORNEY.

THE NORRIS PETERS CO., PHOTO-LITHO., WASHINGTON, D. C.

No. 688,009. Patented Dec. 3, 1901.
P. SIEGEL & M. H. ABRAHAMS.
AUTOMATIC MEANS FOR CONSERVING ENERGY OF ELECTRIC BATTERIES.
(Application filed Apr. 25, 1901.)
(No Model.) 2 Sheets—Sheet 2.
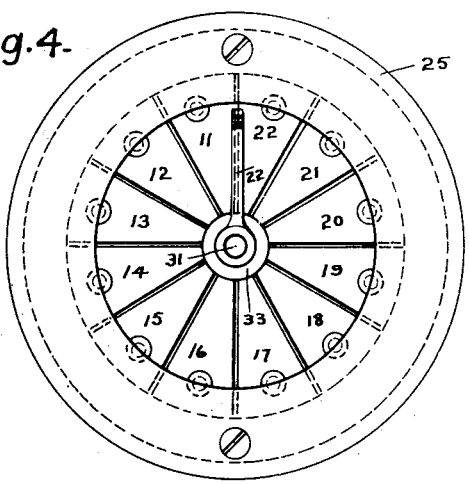
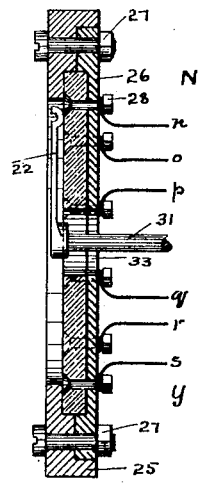
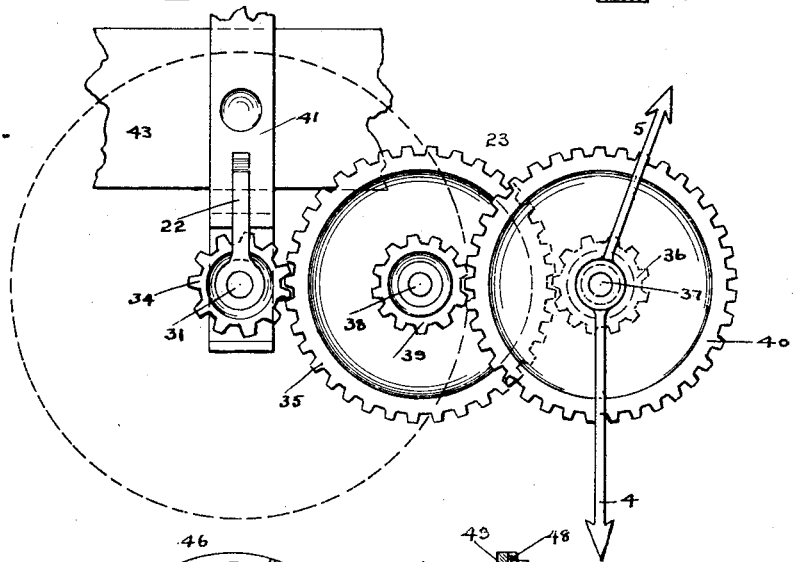
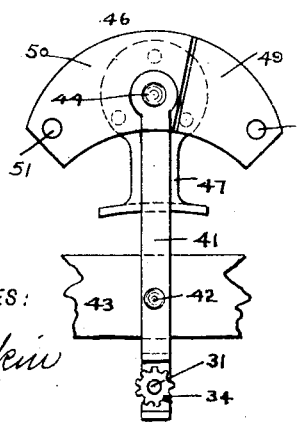
WITNESSES:
M. M. Durkin
L. Duane
INVENTORS
Philip Siegel,
Moïs H. Abrahams,
BY
J. R. Littell
their ATTORNEY.

UNITED STATES PATENT OFFICE.

PHILIP SIEGEL AND MOÏS H. ABRAHAMS, OF NEW YORK, N. Y.

AUTOMATIC MEANS FOR CONSERVING ENERGY OF ELECTRIC BATTERIES.

SPECIFICATION forming part of Letters Patent No. 688,009, dated December 3, 1901.

Application filed April 25, 1901. Serial No. 57,425. (No model.)

*To all whom it may concern:*

Be it known that we, PHILIP SIEGEL and MOÏS H. ABRAHAMS, subjects of the King of Roumania, residing at New York, in the county of and State of New York, have invented certain new and useful Improvements in Automatic Means for Conserving the Energy of Electrical Batteries, of which the following is a specification.

This invention relates to automatic means for conserving the energy of electrical batteries; and it has for its object to provide improved means of this class whereby a cell or number of cells of primary or secondary batteries may be automatically and successively connected with and disconnected from a current-consuming device or medium.

It is well known that the life of primary electrical cells or batteries is dependent upon the length or duration of time of continuous consumption of the energy generated thereby, and if such primary cells or batteries be given alternate periods of rest and use the life of the same may be continued to a relatively great length.

In carrying out our invention we provide a switch mechanism which is interposed between the cell or cells and the current-consuming medium or device and a time-regulated controlling mechanism which controls the operation of the switch mechanism and determines the successive working periods of each cell or group of cells. The time-regulated controlling mechanism may be embodied in a suitable chronometer, which, if desired, may serve also as a timepiece. The cells and the current-consuming device or medium may be located at an insulated point or points, so that it is possible to control the dissipation of energy of the several cells at a point remote from the plant or apparatus which takes energy from the cells.

Figure 1:
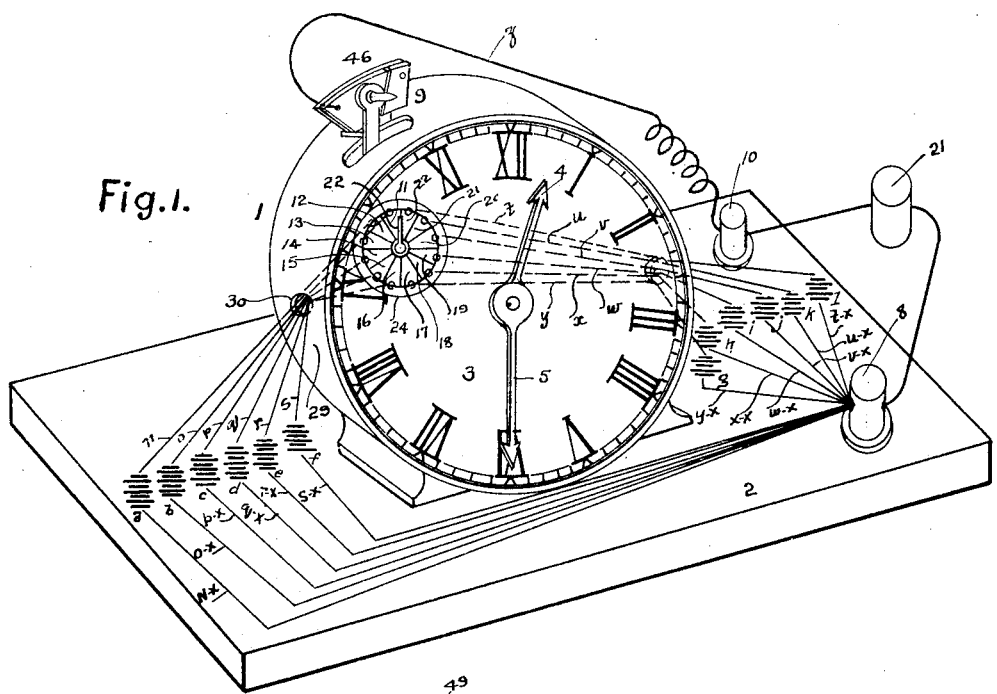
Figure 2:
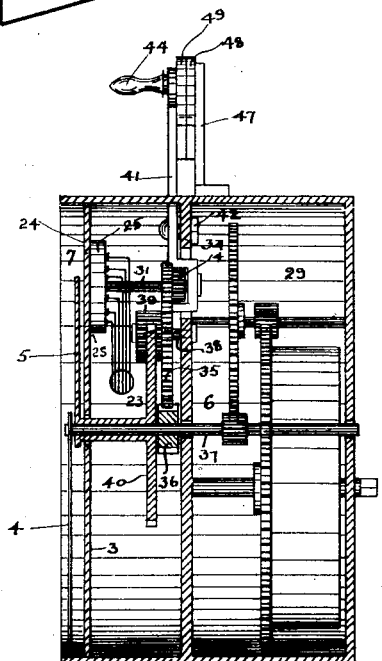

In the drawings, Figure 1 is a perspective view of a chronometer embodying our improved means for conserving the energy of electrical batteries. Fig. 2 is a detail transverse sectional view taken through the chronometer illustrated in Fig. 1 and showing the working parts of our improvements. Fig. 3 is a detail face view of the gearing whereby the operative parts of the chronometer are operatively connected with the operative parts of our improvements. Fig. 4 is a detail face view of a commutator-switch embodied in our improvements. Fig. 5 is a detail transverse sectional view of the same. Fig. 6 is a detail face view of a circuit maker and breaker embodied in our improvements. Fig. 7 is a detail longitudinal sectional view of the same.

Corresponding parts in all the figures are denoted by the same reference characters.

Referring to the drawings, 1 designates a chronometer, which may be of any preferred type and may be for convenience mounted upon a base 2. The chronometer 1 is provided with a customary dial 3 and with the customary hour-pointer 4 and minute-pointer 5, said pointers being actuated by the customary clockwork mechanism 6.

7 designates the improved switch mechanism, which is controlled in its operation by the clockwork mechanism 6, and $a$, $b$, $c$, $d$, $e$, $f$, $g$, $h$, $j$, $k$, $l$, and $m$ designate each a cell or group of cells which are connected each by a separate line-wire $n$, $o$, $p$, $q$, $r$, $s$, $t$, $u$, $v$, $w$, $x$, and $y$ with the switch mechanism 7 and by a separate line-wire $n^\times$, $o^\times$, $p^\times$, $q^\times$, $r^\times$, $s^\times$, $t^\times$, $u^\times$, $v^\times$, $w^\times$, $x^\times$, and $y^\times$ with a binding-post 8. The switch mechanism 7 is provided with a circuit maker and breaker 9, which is electrically connected by a single line-wire $z$ with a separate binding-post 10. The switch mechanism 7 embodies a plurality of points or segments 11, 12, 13, 14, 15, 16, 17, 18, 19, 20, 21, and $22^a$, respectively, with which the several line-wires $n$, $o$, $p$, $q$, $r$, $s$, $t$, $u$, $v$, $w$, $x$, and $y$ are respectively electrically connected, and the switch mechanism also embodies a brush or switch-arm 22, which operates with respect to the segments or points 11 to $22^a$, inclusive, to throw a single unit of the cells or groups of cells $a$ to $m$, inclusive, into electrical circuit between the binding-post 8 and the binding-post 10. The brush or switch-arm 22 is operated by operative connections 23 between the clockwork mechanism of the chronometer and said brush or switch-arm 22, and the circuit maker and breaker 9 carries a member or members of the operative connections 23, whereby said switch-arm or brush 22 may be operatively disconnected from the actuating-clockwork of the chronometer. It will be understood that the current-consuming medium or device (represented at 24) is electrically connected with the binding-posts 8 and 10 in the customary manner.

In the preferred form of construction the switch mechanism 7 is arranged with respect to the dial-plate 3 of the chronometer and consists, as stated, of a plurality of commutator-segments 11 to 22$^a$, which are set into said dial-plate 3 in a composite radial arrangement. The dial-plate 3 preferably consists of a sheet or plate of insulating material which is cut away, as at 24, and flanged, as at 25, to receive said segments 11 to 22$^a$, inclusive, said segments being clamped between said flanged dial-plate and a circular insulating-plate 26, which is secured to the backs or rear surfaces of said segments by pins or screws 27, which pass through the insulating-plate 26 and the flange portions of the dial-plate. The several line-wires $n$ to $y$, inclusive, are connected with the several segments 11 to 22, inclusive, by end pieces or pins 28, which pass through the insulating-plate 26 and are secured each to one of said segments. Said line-wires $n$ to $y$ may enter the casing 29 of the chronometer through an opening or openings 30 in the same and may be led upwardly within the casing 29 free of the operative mechanism therein. The brush or switch-arm 22 is carried upon a shaft 31, which projects through an opening 32, formed centrally of the insulating-plate 26, and an opening 33, formed by the inner spaced ends of the segments 11 to 22.

The operative connections 23 between the clockwork mechanism 6 and the shaft 31 of the brush or switch-arm 22 may consist of a pinion 34, carried by the circuit maker and breaker 9 and arranged to mesh with a gear 35, which meshes with a pinion 36, which is fixed to the shaft 37 of the minute-hand 4. The gear 35 may be mounted upon the shaft 38, which carries a pinion 39, which pinion actuates a gear 40, which operates the hour-hand 5. The pinion 34 may be of such diameter in proportion to the diameter of the pinion 36 as shall be predetermined by the desired speed of movement of the brush or switch-arm 22 relative to that of the minute-hand 4. In the present illustration the pinions 34 and 36 are illustrated as being of the same diameter, whereby the switch-arm or brush 22 completes a single traverse of the twelve segments of the switch mechanism during one complete excursion of the minute-hand 4. It follows, therefore, that the brush or switch-arm 22 is so moved across the faces of the several segments of the switch mechanism as to be maintained in electrical contact with each thereof during a period of five minutes, and each of the cells or groups of cells $a$ to $m$, inclusive, is therefore given a working period of five minutes in a closed electrical circuit through the current-consuming device or medium 21.

The circuit maker and breaker 9 in the preferred form of construction consists of a conducting lever-arm 41, which is pivoted at a point intermediate of its ends, as at 42, to a portion of the frame 43 of the clockwork mechanism and is provided with a finger-piece 44 at the upper end of the same, which upper end projects exteriorly of the casing 29 of the chronometer. The lever-arm 41 carries at its lower end, as at 45, the pinion 34, which constitutes the operative connection between the clockwork mechanism 6 and the shaft 31 of the brush or switch-arm 22, and by oscillating the lever-arm 41 through the medium of the finger-piece 44 said pinion 34 may be thrown into and out of mesh with the gear 35, which meshes with the pinion 36, fixed to the shaft 37, which carries the minute-hand 4. It is thus seen that in order to throw the switch mechanism 7 into and out of operation under actuation of the clockwork mechanism 6 it is only necessary to oscillate the lever-arm 41 in the required direction, as above described. The circuit maker and breaker 9 also embodies a fixed member 46, which is carried by the casing 29 of the chronometer and comprises a post 47, which carries at its upper end a strip or disk of insulating material 48, to one face of which are fixed two non-conducting metallic contact-pieces 49 and 50, respectively, which are arranged to receive the upper end portion of the lever-arm 41 in electrical contact under the inherent spring-pressure of said lever-arm 41. The line-wire $z$, which extends between the circuit maker and breaker and the binding-post 10 is electrically connected with the metallic piece 50, as at 51, and when the lever-arm 40 is in electrical contact with the metallic piece 50 a closed electrical circuit may be completed through the brush or switch-arm 22, the shaft 31 of the same, the lever-arm 41, the metallic piece 50, and the line-wire $z$. With the parts in this position to permit the establishment of the said closed electrical circuit through the several parts last enumerated the operative connections 23 are in operative position to permit actuation of the switch mechanism 7 by the clockwork mechanism 6. When, however, the lever-arm 41 is actuated to bring the upper end of the same into contact with the metallic piece 49 of the fixed member 46 of the circuit maker and breaker 9, said closed circuit is broken because of the interposition of the insulating-disk 48 between the metallic piece 49 and the line-wire $z$. It therefore follows that the possibility of establishing a closed electrical circuit through the switch mechanism 7 and between one of the cells or groups of cells $a$ to $m$, inclusive, and the current-consuming device or medium 21 is precluded when the operative connections 23 between the clockwork mechanism 6 and the switch mechanism 7 are in inoperative position under adjustment by the lever-arm 41 of the circuit maker and breaker 9. This relative arrangement and operative association of parts is of advantage, as it prevents the dissipation of electrical energy of any one of the cells or groups of cells $a$ to $m$, inclusive, for a longer period than that determined by the proper operation of the switch mechanism 7 under actuation of the clockwork mechanism 6. The metallic piece 49 of the fixed member 46 of the circuit maker and breaker 9 constitutes simply a rest-point or guide for the upper end of the lever-arm 41 when the latter is in inoperative position and may be of any desired material, but is preferably of metal, as a free movement of the upper end of the lever-arm 41 over the surface of the same is thereby permitted.

The operation and advantages of our improved mechanism will be readily understood by those skilled in the art to which it appertains.

The current-consuming medium or device 21 draws its supply of electrical energy successively from the several cells or several groups of cells $a$, $b$, $c$, $d$, $e$, $f$, $g$, $h$, $j$, $k$, $l$, and $m$, through the switch mechanism 7, the circuit maker and breaker 9, and the line-wire $z$, which elements connect with one pole of each of the cells or groups of cells $a$ to $m$, and through the line-wires $n^\times$, $o^\times$, $r^\times$, $s^\times$, $t^\times$, $u^\times$, $v^\times$, $w^\times$, $x^\times$, and $y^\times$, which connect, respectively, with the other poles of the several cells or groups of cells $a$ to $m$, inclusive. As each of the cells or groups of cells $a$ to $m$, inclusive, connects electrically with a separate segment of the switch mechanism 7 and the brush or switch-arm 22 can have electrical contact with but one of said segments at a given moment, it is manifest that the current-consuming device or medium 21 can draw its supply of electrical energy through the switch mechanism 7 from but one of the cells or groups of cells at a given moment. As the brush or switch-arm 22 of the switch mechanism moves successively in electrical contact over the outer faces of the segments of the switch mechanism the several cells or groups of cells are thrown successively into electrical connection with the current-consuming device or medium 21, and this alternation of consumption of the electrical energy of the several cells or groups of cells prevents the dissipation or depletion of electrical energy of any one of the cells or groups of cells, which dissipation or depletion normally follows the continued use of a given cell or groups of cells for an extended period of time. The several parts of the switch mechanism 7 and the circuit maker and breaker 9 being in operative position and association, as illustrated, the circuit through a given cell or groups of cells may be readily traced. With the brush or switch-arm 22 in electrical contact with the segment 11 of the switch mechanism and the current-consuming device or medium 21 in electrical connection with the binding-posts 8 and 10 a closed circuit will exist through the current-consuming device 21, the binding-post 8, the line-wire $n^\times$, the cell or groups of cells $a$, the line-wire $n$, the segment 11 of the switch mechanism 7, the brush or switch-arm 22, the shaft 31, the lever-arm 41, the metallic contact-piece 50, the line-wire $z$, the binding-post 10, and thence again into and through the current-consuming device or medium 21. The closed circuits through the several cells or groups of cells may be similarly traced when the brush or switch-arm 22 is in electrical contact with the segments of the switch mechanism 7, which are electrically connected by means of the several line-wires $n$ to $y$, inclusive, with the several cells or groups of cells. With the operative connections 23 between the brush or switch-arm 22 and the clockwork mechanism 6, formed and proportioned as described and illustrated, the brush or switch-arm 22 performs a complete excursion over the contact-surfaces of the several segments of the switch mechanism 7 during one complete excursion of the minute-hand 4 over the dial of the chronometer. As there are twelve of the segments of the switch mechanism in the present illustration and said segments are of equal size, each of the cells or groups of cells $a$ to $m$, inclusive, will successively be shunted into circuit with the current-consuming device or medium 21 throughout the operation of the chronometer, and the period of consumption of the electrical energy of each of said cells or groups of cells will be five minutes or one-twelfth of the total amount of time consumed by one complete excursion of the minute-hand 4 over the dial of the chronometer. By oscillating the lever-arm 41 laterally to bring the upper end portion of the same into contact with the plate 49 the operative connections 23 may be disassociated from the clockwork mechanism 6 of the chronometer, and the actuation of the brush or switch-arm 22 will be terminated simultaneously with the interruption of the closed circuit previously established through one of the cells or groups of cells and the switch mechanism 7. It follows that the termination of the actuation of the switch mechanism 7 is accompanied by the termination of all consumption of the electrical energy of the several cells or groups of cells, and the depletion of the electrical energy of the cells or groups of cells during the period of inaction of the switch mechanism 7 is thus prevented.

It is manifest that by varying the number of segments of the switch mechanism and by varying the construction and proportion of parts of the operative connections 23 between the switch mechanism and the clockwork mechanism the several cells or groups of cells may be caused to expend their electrical energy during working periods of longer or shorter duration. The number of cells connected with any one of the segments of the switch mechanism may be varied in proportion to the working energy required during any time unit to supply the current-consuming device or medium 21.

By means of our improved mechanism the life of a number of cells or groups of cells, either primary or secondary, may be greatly increased and primary cells hitherto unadapted to long periods of continuous work may be made effectual for continuous service by the employment of the same.

The several features and parts of our improved mechanism may be inclosed or incased, as desired, to obscure the same and retain for the chronometer an appearance in the main normal and decorative.

We do not desire to be understood as limiting ourselves to the details of construction and arrangement as herein described and illustrated, as it is manifest that variations and modifications may be made in the features of construction and arrangement in the adaptation of the device to various conditions of use without departing from the spirit and scope of our invention and improvements. We therefore reserve the right to all such variation and modification as properly falls within the scope of our invention and the terms of the following claims.

Having thus described our invention, we claim and desire to secure by Letters Patent—

1. In means of the class described, a switch mechanism provided with a plurality of switch-points or circuit members, a movable switch-arm or brush arranged for successive contact with said switch-points or circuit members, operating means for said switch-arm or brush, adjustable operative connections between said operating means and said switch-arm or brush, and a circuit maker and breaker electrically connected with said switch-arm or brush and operatively connected with said operative connections whereby said switch-arm or brush may be thrown out of operation.

2. In means of the class described, a switch mechanism comprising a plurality of switch-points or circuit members, a movable switch-arm or brush arranged for successive separate electrical contact with each of said switch-points or circuit members, controlling means for operating said switch-arm or brush, adjustable operative connections between said controlling means and said switch-arm or brush, and means for throwing said adjustable operative connections into and out of operative position.

3. In means of the class described, a switch mechanism comprising a plurality of segments or circuit members, a movable switch-arm or brush arranged for successive separate electrical contact with said segments or circuit members, controlling means for operating said switch-arm or brush, adjustable operative connections between said controlling means and said switch-arm or brush, and a circuit maker and breaker embodying a movable member which is electrically connected with said switch-arm or brush and is operatively connected with said operative connections whereby said switch-arm or brush may be thrown out of operation simultaneously with the breaking of an electrical circuit through said switch mechanism.

4. In means of the class described, a switch mechanism embodying a plurality of switch-points or circuit members, a switch-arm or brush arranged for successive separate electrical contact with said switch-points or circuit members, controlling means for operating said switch-arm or brush and comprising a clockwork mechanism, said switch-arm or brush being mounted upon a shaft provided with a pinion, adjustable operative connections between said controlling mechanism and said switch-arm or brush and comprising a movably-mounted pinion arranged to mesh simultaneously with said clockwork mechanism and the pinion of said switch-arm or brush, and means for throwing said operative connections into and out of operative position.

5. In means of the class described, a switch mechanism, controlling means for operating the same, operative connections between the switch mechanism and the controlling mechanism, and a circuit maker and breaker provided with a movable member which is operatively connected with said operative connections between said controlling mechanism and said switch mechanism and is electrically connected with said switch mechanism, the circuit maker and breaker also embodying a fixed member consisting of two relatively-insulated parts with which said movable member of said circuit maker and breaker is arranged to contact, one of said parts of said fixed member of said circuit maker and breaker constituting a circuit member.

6. In means of the class described, a switch mechanism, controlling mechanism for operating said switch mechanism, adjustable operative connections between said switch mechanism and said controlling mechanism, and a circuit maker and breaker comprising a fixed member and a movable member, said movable member of said circuit maker and breaker being operatively connected with said operative connections between said controlling mechanism and said switch mechanism and being electrically connected with said switch mechanism whereby said switch mechanism may be thrown out of operation simultaneously with the making and breaking of an electrical circuit.

7. In means of the class described, a switch mechanism embodying a plurality of switch-points or circuit members, a switch-arm or brush arranged for successive separate electrical contact with said switch-points or circuit members, controlling means for operating said switch-arm or brush and comprising a clockwork mechanism, said switch-arm or brush being mounted upon a shaft provided with a pinion, said pinion and shaft being movable, adjustable operative connections between said controlling mechanism and said switch-arm or brush and comprising said movably-mounted pinion adapted, when in operative position, to mesh with said clockwork mechanism, and means for throwing said operative connections into and out of operative position.

8. In means of the class described, a switch mechanism, a circuit maker and breaker provided with a movable member, a shaft carried by said movable member provided with a pinion a switch-arm or brush mounted on said shaft, and clockwork mechanism adapted, when in operative position, to mesh with said movable pinion and control the operation of said switch-arm or brush.

9. In means of the class described, a switch mechanism provided with a plurality of circuit members, a movable switch member arranged for successive contact with said circuit members, operating means for said switch member, a circuit maker and breaker electrically connected with said switch member, and means for simultaneously throwing said switch member out of operation and operating said circuit maker and breaker.

10. In means of the class described, a switch mechanism provided with a plurality of circuit members, a movable switch member arranged for successive contact with said circuit members, operating means for said switch member, a plurality of sources of electrical supply connected respectively with said circuit members and connected jointly with said circuit maker and breaker, and means for simultaneously throwing said switch member out of operation and operating said circuit maker and breaker.

In testimony whereof we have signed our names in the presence of the subscribing witnesses.

PHILIP SIEGEL.
MOÏS H. ABRAHAMS.

Witnesses:
J. R. LITTELL,
GEORGE VAIL HUPPERTZ.